(12) United States Patent
Yoneyama

(10) Patent No.: US 11,895,381 B2
(45) Date of Patent: Feb. 6, 2024

(54) IMAGE PICKUP APPARATUS FOR ENDOSCOPE, AND ENDOSCOPE

(71) Applicant: OLYMPUS CORPORATION, Tokyo (JP)

(72) Inventor: Jumpei Yoneyama, Nagano (JP)

(73) Assignee: OLYMPUS CORPORATION, Tokyo (JP)

( * ) Notice: Subject to any disclaimer, the term of this patent is extended or adjusted under 35 U.S.C. 154(b) by 218 days.

(21) Appl. No.: 17/396,081

(22) Filed: Aug. 6, 2021

(65) Prior Publication Data
US 2021/0368073 A1 Nov. 25, 2021

Related U.S. Application Data

(63) Continuation of application No. PCT/JP2019/009930, filed on Mar. 12, 2019.

(51) Int. Cl.
*H04N 23/54* (2023.01)
*H04N 23/55* (2023.01)
*H04N 23/50* (2023.01)

(52) U.S. Cl.
CPC .............. *H04N 23/54* (2023.01); *H04N 23/55* (2023.01); *H04N 23/555* (2023.01)

(58) Field of Classification Search
CPC ...... H04N 23/54; H04N 23/55; H04N 23/555; A61C 1/04; G02B 7/02; G02B 23/26; H01L 27/14
See application file for complete search history.

(56) References Cited

U.S. PATENT DOCUMENTS

2004/0047274 A1 3/2004 Amanai
2005/0128597 A1 6/2005 Amanai
(Continued)

FOREIGN PATENT DOCUMENTS

JP 2004-087718 A 3/2004
JP 2004-088713 A 3/2004
(Continued)

OTHER PUBLICATIONS

International Search Report dated May 14, 2019 received in PCT/JP2019/009930.
(Continued)

*Primary Examiner* — Nasim N Nirjhar
(74) *Attorney, Agent, or Firm* — Scully, Scott, Murphy & Presser, P.C.

(57) ABSTRACT

An image pickup apparatus for endoscope includes: an image pickup member provided with a plurality of image pickup side faces; a first optical member provided with first side faces; a first bonding layer bonding together the image pickup member and the first optical member; a second optical member provided with second side faces; and a second bonding layer bonding together the second optical member and the first optical member, in which a plurality of first side faces include first near side faces closer to an optical axis than are the second side faces and the image pickup side faces, and the image pickup apparatus for endoscope further includes a sealing resin covering the first near side faces, at least part of the first bonding layer, and the second bonding layer.

20 Claims, 9 Drawing Sheets

(56) References Cited

U.S. PATENT DOCUMENTS

| | | | |
|---|---|---|---|
| 2008/0185603 A1* | 8/2008 | Itoi | H01L 31/0203 |
| | | | 257/E33.059 |
| 2010/0073534 A1 | 3/2010 | Yano et al. | |
| 2019/0076002 A1* | 3/2019 | Shimohata | H04N 23/00 |
| 2021/0134868 A1* | 5/2021 | Tsujio | H01L 27/14618 |

FOREIGN PATENT DOCUMENTS

| | | |
|---|---|---|
| JP | 2008-180922 A | 8/2008 |
| JP | 2010-103493 A | 5/2010 |
| JP | 2012-093485 A | 5/2012 |
| JP | 2012-177750 A | 9/2012 |
| JP | 2013-524301 A | 6/2013 |
| JP | 2013-535708 A | 9/2013 |
| JP | 2014-524597 A | 9/2014 |
| JP | 2018-120112 A | 8/2018 |
| WO | 2017/203592 A1 | 11/2017 |
| WO | 2019/138639 A1 | 7/2019 |

OTHER PUBLICATIONS

English abstract only of WO 2013/026175 A1.
English abstract only of WO 2012/022000 A1.
English abstract only of WO2011/133746 A1.

\* cited by examiner

IMAGE PICKUP APPARATUS FOR ENDOSCOPE, AND ENDOSCOPE

CROSS REFERENCE TO RELATED APPLICATION

This application is a continuation application of PCT/JP2019/009930 filed on Mar. 12, 2019, the entire contents of which are incorporated herein by this reference.

BACKGROUND OF THE INVENTION

1. Field of the Invention

The present invention relates to an image pickup apparatus for endoscope including optical members each made up of a plurality of optical elements stacked together and an image pickup member, and to an endoscope including an image pickup apparatus for endoscope, the image pickup apparatus for endoscope including optical members each made up of a plurality of optical elements stacked together and an image pickup member.

2. Description of the Related Art

For an image pickup apparatus for endoscope which is disposed in a rigid distal end portion of an endoscope, it is important to reduce its diameter in order to alleviate invasiveness. Methods for efficiently producing optical members of an image pickup apparatus include a wafer-level process that involves stacking a plurality of optical wafers each including a plurality of optical elements to make a stacked optical wafer, and cutting the stacked optical wafer into a plurality of individual optical members. Optical members made by the wafer-level process are referred to as wafer-level optical members.

Japanese Patent Application Laid-Open Publication No. 2010-103493 discloses an image pickup apparatus that includes a wafer-level optical member and an image pickup member.

A wafer-level optical member includes a large number of optical elements in order to obtain predetermined optical characteristics. It is not easy to stack a large number of wafers at a time. By making two or more stacked wafers each made up of a plurality of wafers stacked together and bonding together the two or more stacked wafers, it becomes easy to make a wafer-level optical member.

SUMMARY OF THE INVENTION

An image pickup apparatus for endoscope according to an embodiment of the present invention includes: an image pickup member provided with an image pickup device and a plurality of image pickup side faces; a first optical member made up of a plurality of first optical elements stacked together, the first optical member being provided with a plurality of first side faces; a first bonding layer bonding together the image pickup member and the first optical member; a second optical member made up of a plurality of second optical elements stacked together, the second optical member being provided with a plurality of second side faces; and a second bonding layer bonding together the second optical member and the first optical member, wherein at least any of the plurality of first side faces includes a first near side face closer to an optical axis than are the second side faces and the image pickup side faces, at least any of the plurality of second side faces includes a second near side face closer to the optical axis than are the first side faces and the image pickup side faces, the first near side face is a bottom face of a first trench formed in an appropriate one of the first side faces and parallel to the optical axis, the second near side face is a bottom face of a second trench formed in an appropriate one of the second side faces and parallel to the optical axis, each of the first trench and the second trench includes a superimposed region in which the first trench and the second trench are superimposed and a non-superimposed region in which the first trench and the second trench are not superimposed when seen through in a direction of the optical axis, and the image pickup apparatus for endoscope further includes a sealing resin filling the first trench and the second trench and covering the first near side face, at least part of the first bonding layer, and at least part of the second bonding layer.

An endoscope according to another embodiment of the present invention includes an image pickup apparatus for endoscope, the image pickup apparatus for endoscope including: an image pickup member provided with an image pickup device and a plurality of image pickup side faces; a first optical member made up of a plurality of first optical elements stacked together, the first optical member being provided with a plurality of first side faces; a first bonding layer bonding together the image pickup member and the first optical member; a second optical member made up of a plurality of second optical elements stacked together, the second optical member being provided with a plurality of second side faces; and a second bonding layer bonding together the second optical member and the first optical member, wherein at least any of the plurality of first side faces includes a first near side face closer to an optical axis than are the second side faces and the image pickup side faces, at least any of the plurality of second side faces includes a second near side face closer to the optical axis than are the first side faces and the image pickup side faces, the first near side face is a bottom face of a first trench formed in an appropriate one of the first side faces and parallel to the optical axis, the second near side face is a bottom face of a second trench formed in an appropriate one of the second side faces and parallel to the optical axis, each of the first trench and the second trench includes a superimposed region in which the first trench and the second trench are superimposed and a non-superimposed region in which the first trench and the second trench are not superimposed when seen through in a direction of the optical axis, and the image pickup apparatus for endoscope further includes a sealing resin filling the first trench and the second trench and covering the first near side face, at least part of the first bonding layer, and at least part of the second bonding layer.

DETAILED DESCRIPTION OF THE PREFERRED EMBODIMENTS

<Endoscope>

Figure 1:
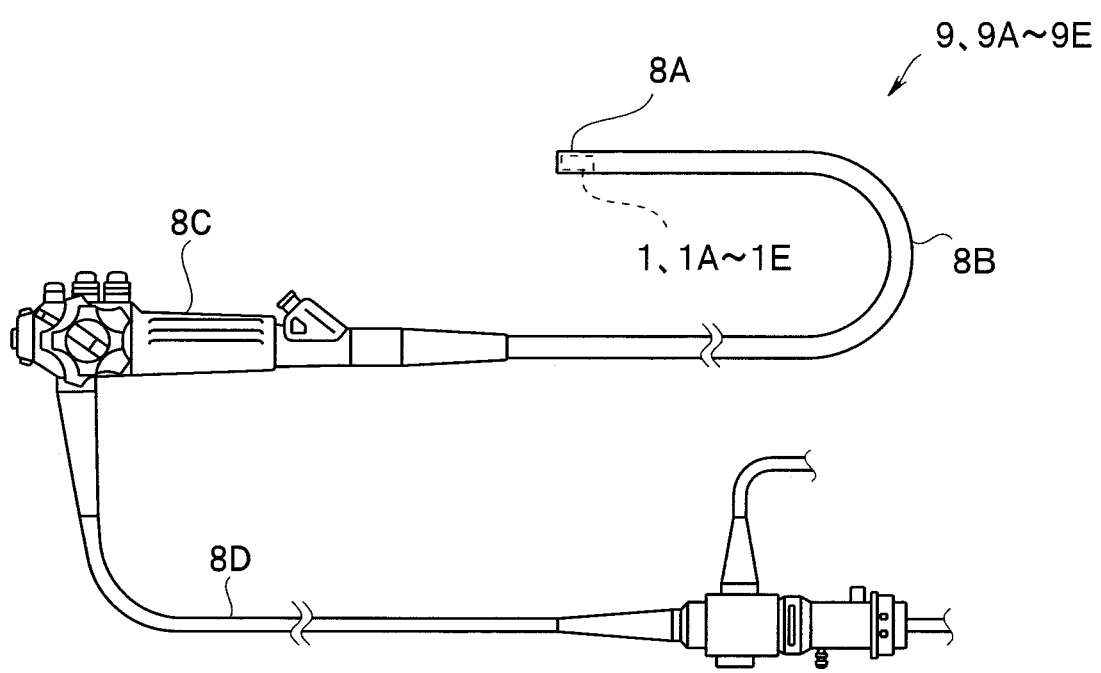
FIG. 1 an external view of an endoscope according to embodiments.

As shown in FIG. 1, endoscopes 9 and 9A to 9E according to embodiments of the present invention each include an insertion portion 8B having an image pickup apparatus for endoscope 1, 1A to 1E (also referred to as "image pickup apparatus" 1, 1A to 1E) disposed in a rigid distal end portion 8A, an operation portion 8C disposed on a proximal end side of the insertion portion 8B, and a universal cord 8D extending from the operation portion 8C. The image pickup apparatus 1, which is disposed in the distal end portion 8A of the insertion portion 8B of the endoscope 9, outputs an image pickup signal. The image pickup signal outputted from the image pickup apparatus 1 is transmitted to a processor via a cable inserted through the universal cord 8D. A drive signal from the processor to the image pickup apparatus 1 is also transmitted via the cable inserted through the universal cord 8D.

As described later, the image pickup apparatuses 1 and 1A to 1E have small outer dimensions in a direction orthogonal to an optical axis, have high performance, and are easy to produce. Thus, the endoscopes 9 and 9A to 9E are low in invasiveness, high in performance, and easy to produce. Note that the endoscopes 9 and 9A to 9E may be rigid endoscopes with a rigid insertion portion and may have either medical or industrial applications.

First Embodiment

Figure 2:
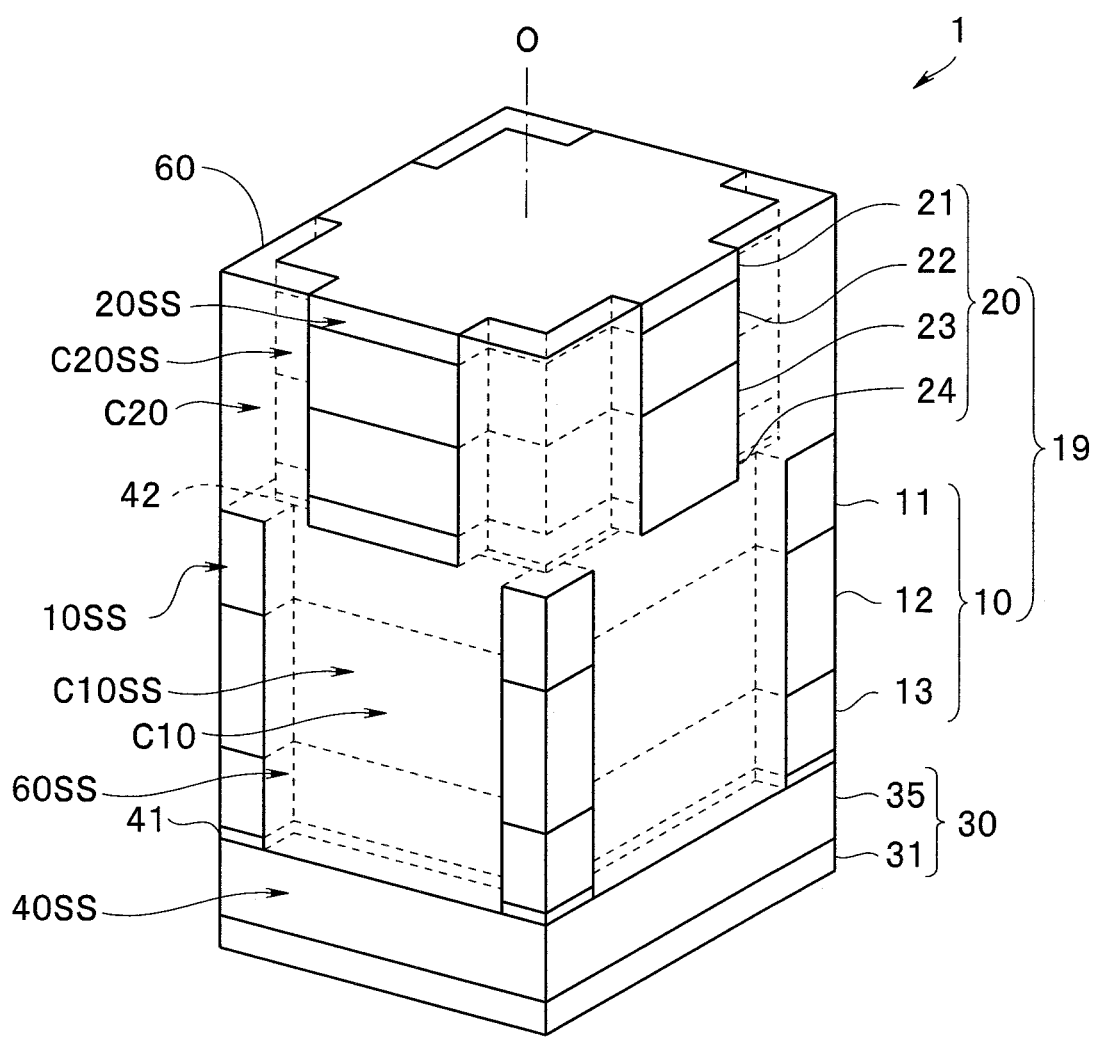
FIG. 2 is a perspective view of an image pickup apparatus according to a first embodiment.
Figure 3:
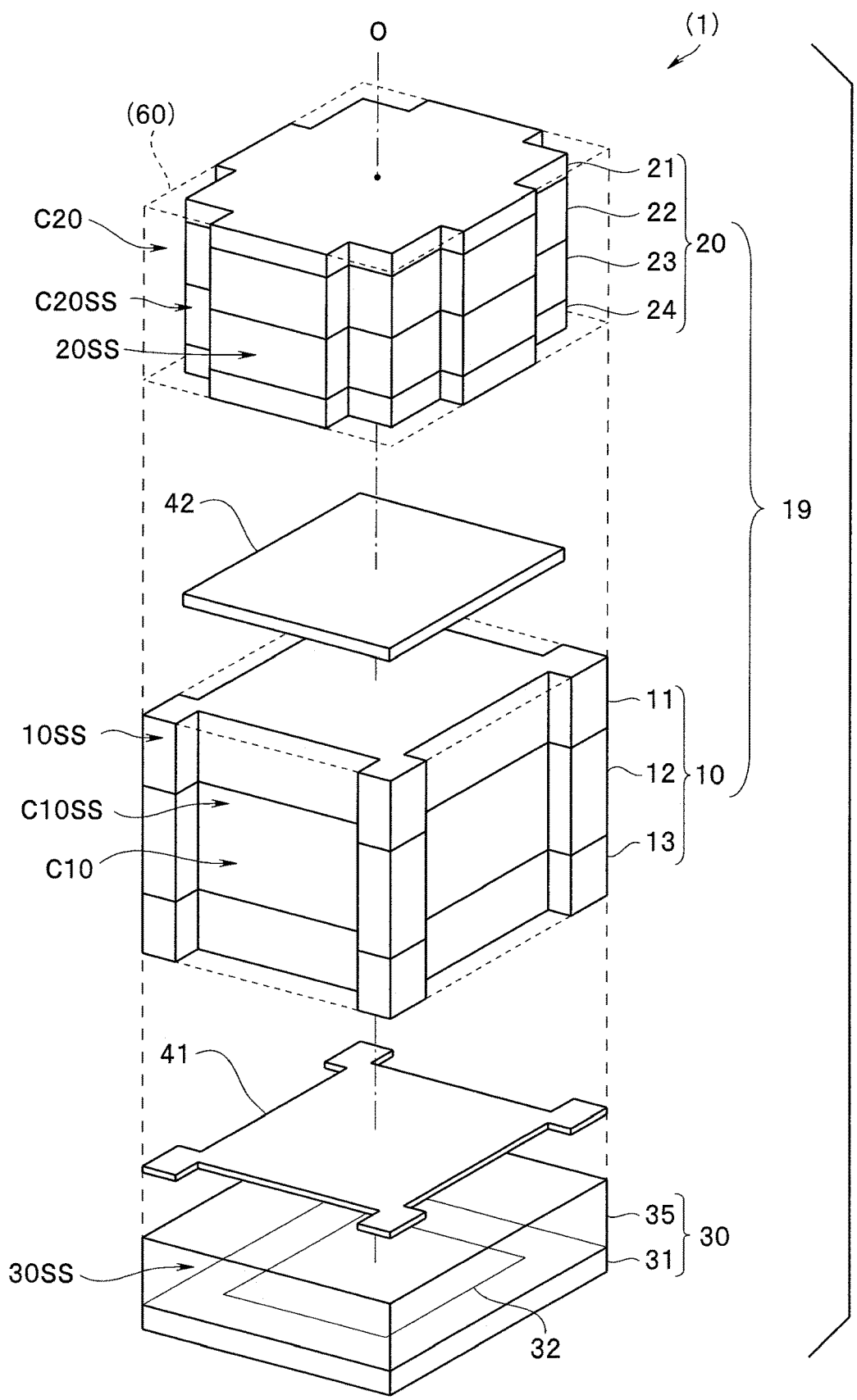
FIG. 3 is an exploded cross-sectional view of the image pickup apparatus according to the first embodiment.
Figure 4:
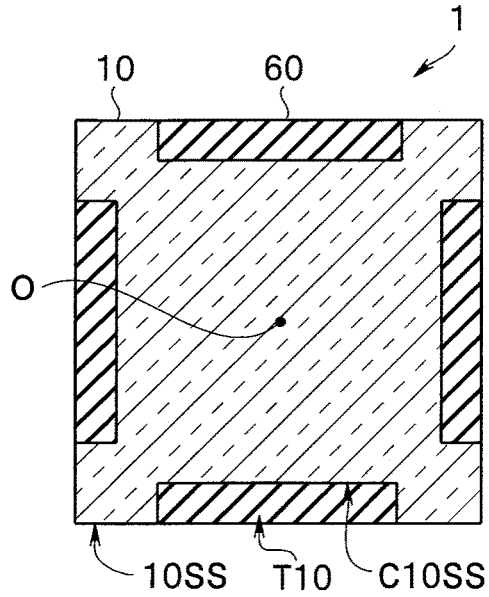
FIG. 4 is a cross-sectional view of a first optical member of the image pickup apparatus according to the first embodiment.
Figure 5:
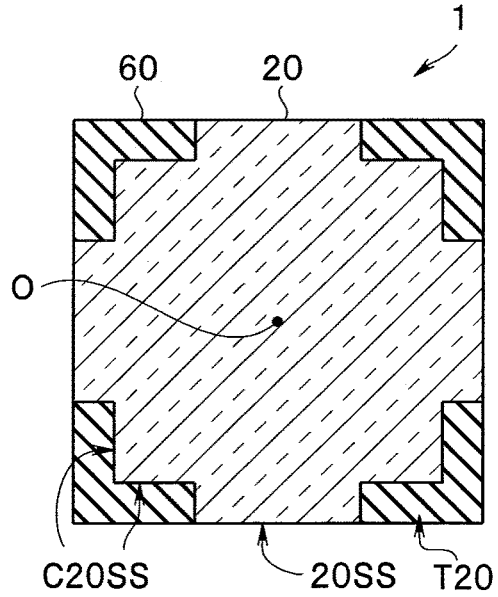
FIG. 5 is a cross-sectional view of a second optical member of the image pickup apparatus according to the first embodiment.

As shown in FIGS. 2 and 3, the image pickup apparatus 1 according to the present embodiment includes a first optical member 10, a second optical member 20, an image pickup member 30, a first bonding layer 41, a second bonding layer 42, and sealing resin 60.

In the following description, drawings of the respective embodiments are schematic. A relationship between thickness and width of each component, as well as thickness ratio and relative angles among individual components are different from actual ones. Some of dimensional relationships or ratios may not be uniform among drawings. Illustrations of some components are omitted. For example, structures of the first optical member 10 and the second optical member 20 are not illustrated. The side closer to the subject along the optical axis is designated as the "front" and the side closer to the image pickup member 30 is designated as the "rear."

The image pickup member 30 includes an image pickup device 31 and a cover glass 35. The image pickup device 31 includes a light receiving area 32 made up of a CCD and the like. The image pickup device 31 may be either a front-illuminated image sensor or a back-illuminated image sensor. Note that the image pickup member 30 does not have to include the cover glass 35 used to protect the light receiving area 32 of the image pickup device 31. The image pickup member 30 is of a substantially rectangular parallelepiped shape provided with four image pickup side faces 30SS.

The first optical member 10 is a wafer-level stacked optical system made up of a plurality of optical elements 11 to 13 stacked together. The second optical member 20 is a wafer-level stacked optical system made up of a plurality of optical elements 21 to 24 stacked together.

The first optical member 10 is of a substantially rectangular parallelepiped shape provided with four first side faces 10SS. A first trench C10 is provided in center part of each of the four first side faces 10SS. Two first trenches C10 in each pair of adjacent first side faces 10SS form a peninsular projection at each corner of the first optical member 10. The first trenches C10 are parallel to the optical axis O. Bottom faces of the first trenches C10 closer to the optical axis O than are the first side faces 10SS and the image pickup side faces 30SS are referred to as first near side faces C10SS, where the bottom faces are parallel to the optical axis.

The second optical member 20 is of a substantially rectangular parallelepiped shape provided with four second side faces 20SS. A second trench C20 is provided in an edge portion of each of the four second side faces 20SS. In other words, the second optical member 20, in which the second trench C20 is formed in a ridge between each pair of adjacent second side faces 20SS, has a cut in each corner. Bottom faces of the second trenches C20 parallel to the optical axis O and closer to the optical axis O than are the second side faces 20SS and the image pickup side faces 30SS are referred to as second near side faces C20SS, where the bottom faces are parallel to the optical axis.

In conjunction with the first optical member 10, the second optical member 20 makes up an image pickup optical system 19 configured to form a subject image on the image pickup device 31. Since the first trenches C10 and the second trenches C20 are formed on outer sides of an optical path, the first trenches C10 and the second trenches C20 do not adversely affect optical characteristics of the image pickup optical system 19.

For example, the optical element includes a glass plate and a resin lens. Another optical element is an infrared cut filter element having a function of cutting off infrared rays. Configurations of the first optical member 10 and the second optical member 20 are designed according to the specifications of the image pickup apparatus.

The first bonding layer 41 bonds together the image pickup member 30 and the first optical member 10. The second bonding layer 42 bonds the second optical member 20 to an optical front side of the first optical member 10 (a side opposite to the image pickup member 30). The first bonding layer 41 and the second bonding layer 42 are made of transparent ultraviolet-curing resin disposed on the optical path.

The sealing resin 60 is disposed in the first trenches C10 and the second trenches C20. The sealing resin 60 filling the first trenches C10 improves bonding strength of the plurality of optical elements 11 to 13. The sealing resin 60 filling the second trenches C20 improves bonding strength of the plurality of optical elements 21 to 24.

Figure 6:
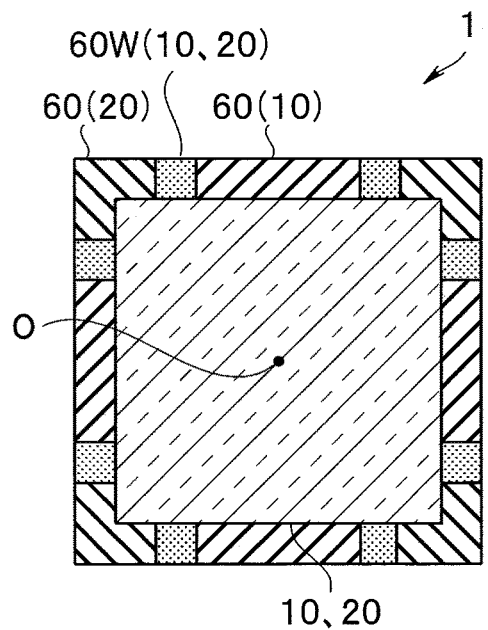
FIG. 6 is a schematic cross-sectional view for explaining a stacked state of the image pickup apparatus according to the first embodiment.

The first trenches C10 and the second trenches C20 each include superimposed regions (overlapping regions) in which the first trenches C10 and the second trenches C20 are superimposed, and non-superimposed regions (non-overlapping regions) in which the first trenches C10 and the second trenches C20 are not superimposed, when seen through in a direction of the optical axis O. Therefore, as shown in FIG. 6, when the sealing resin 60 is seen through in the direction of the optical axis O, sealing resin 60 (10) filled in the first trenches C10 and sealing resin 60 (20) filled in the second trenches C20 include sealing resin 60W (10, 20) in which the sealing resin 60 (10) and the sealing resin 60 (20) are superimposed with each other. In other words, the sealing resin 60 (10) and the sealing resin 60 (20) are connected with each other via the sealing resin 60W (10, 20). The sealing resin 60 (10) and the sealing resin 60 (20) connected in this way improve bonding strength of the first optical member 10 and the second optical member 20.

Since the sealing resin 60 is filled in the first trenches C10 and the second trenches C20, disposing of the sealing resin 60 does not cause an increase in the outer dimensions of the image pickup apparatus 1 in the direction orthogonal to the optical axis. In other words, resin side faces 60SS, which are side faces of the sealing resin 60, are flush with both the first side faces 10SS and the second side faces 20SS.

The sealing resin 60 covers not only the first near side faces C10SS, which are the bottom faces of the first trenches C10, but also part of side faces of the first bonding layer 41 and all side faces of the second bonding layer 42. By being covered with the sealing resin 60, the first bonding layer 41 and the second bonding layer 42 are protected from ingress of water.

While the image pickup apparatus 1 has improved reliability due to the sealing resin 60, the image pickup apparatus 1 still has the same outer dimensions as image pickup apparatuses in which the sealing resin 60 is not disposed. Therefore, the endoscope 9 equipped with the image pickup apparatus 1 has low invasiveness.

The sealing resin 60 in the region in which the sealing resin 60 (10) and the sealing resin 60 (20) are connected with each other covers all side faces of the second bonding layer 42, which bonds together the first optical member 10 and the second optical member 20. Thus, the sealing resin 60 in the region not only improves bonding strength of the second bonding layer 42, but also has the effect of preventing ingress of water into the second bonding layer 42.

For example, the first trenches C10 are formed after a first stacked wafer containing a plurality of first optical members 10 is cut. The first optical members 10 provided with the first trenches C10 may be made by forming a first through-hole of a predetermined shape between each pair of adjacent first optical members 10 on the first stacked wafer containing a plurality of first optical members 10 and then cutting the first stacked wafer along a cutting-plane line crossing the first through-hole.

Furthermore, cutting may be done after bonding together a first stacked wafer containing a plurality of first optical members 10 and having first through-holes, a second stacked wafer containing a plurality of second optical members 20 and having second through-holes, and an image pickup wafer using the second bonding layer 42, and then filling the sealing resin 60 into the first through-holes and the second through-holes. Since the first through-holes and the second through-holes communicate with each other, it is easy to fill the sealing resin 60 into the first through-holes and the second through-holes.

While having the sealing resin 60 disposed on side faces of two wafer-level optical members (the first optical member 10 and the second optical member 20), the image pickup apparatus 1 is small in diameter. Since the bonding strength of the optical elements 11 to 13, the bonding strength of the optical elements 21 to 24, and the bonding strength of the second bonding layer 42 are improved by the sealing resin 60 disposed across the first trenches C10 and the second trenches C20, the image pickup apparatus 1 has high reliability. The endoscope 9 equipped with the image pickup apparatus 1 has high reliability.

Needless to say, an image pickup apparatus containing three or more wafer-level optical members would have the same effects as the image pickup apparatus 1 if at least two of the wafer-level optical members have the same configurations as the first optical member 10 and second optical member 20 of the image pickup apparatus 1.

<Modifications of First Embodiment>

Image pickup apparatuses 1A to 1C according to Modifications 1 to 3 of the first embodiment are similar to the image pickup apparatus 1 and provide the same effects as the image pickup apparatus 1. Thus, components of the same functions as those in the image pickup apparatus 1 are denoted by the same reference signs as in the first embodiment and description thereof will be omitted.

<Modification 1 of First Embodiment>

Figure 7:
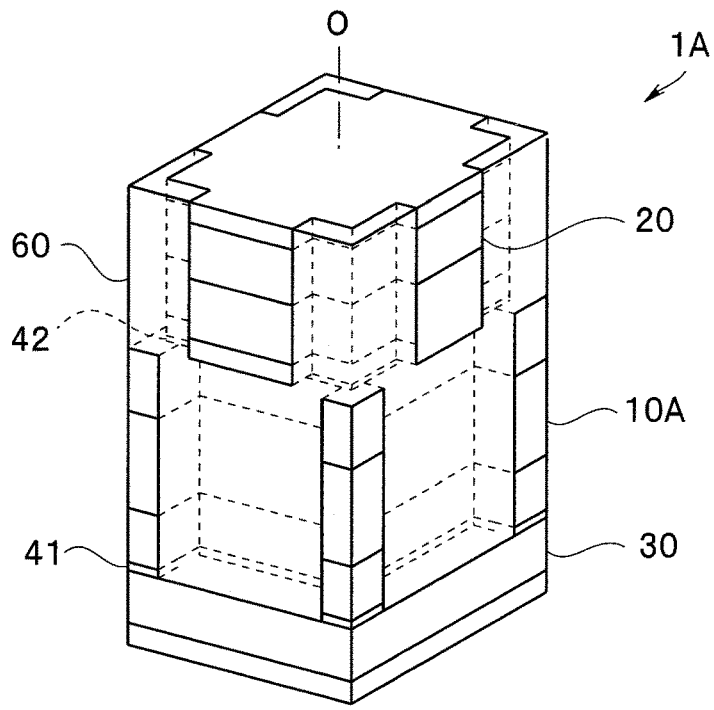
FIG. 7 is a perspective view of an image pickup apparatus according to Modification 1 of the first embodiment.
Figure 8:
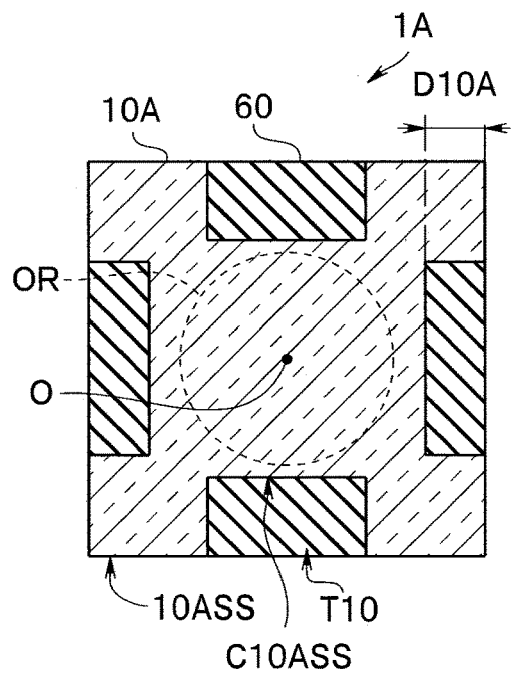
FIG. 8 is a cross-sectional view of a first optical member of the image pickup apparatus according to Modification 1 of the first embodiment.
Figure 9:
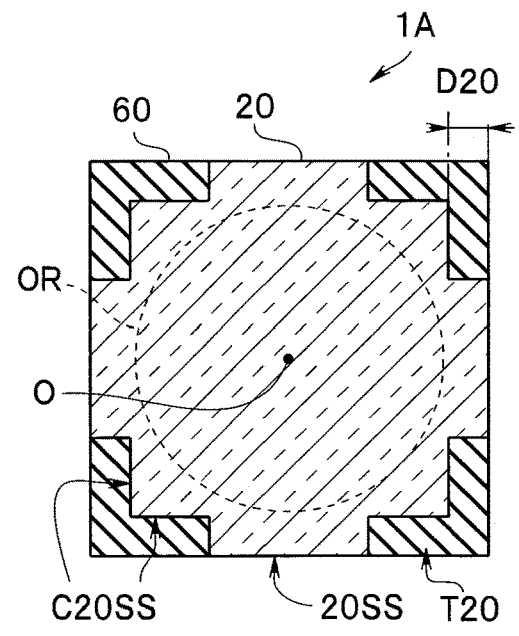
FIG. 9 is a cross-sectional view of a second optical member of the image pickup apparatus according to Modification 1 of the first embodiment.

In the image pickup apparatus 1A according to Modification 1 of the first embodiment shown in FIGS. 7 to 9, a depth D10A of the first trenches C10 of a first optical member 10A is larger than a depth D20 of the second trenches C20 of the second optical member 20.

As shown in FIGS. 8 and 9, an optical path region OR of the first optical member 10A, which is disposed at a position closer to the image pickup member 30 than is the second optical member 20, is smaller than an optical path region OR of the second optical member 20.

The first trenches C10, which are deeper than the second trenches C20, do not affect the optical path region OR. Strength of the sealing resin 60 filled in the deep trenches is larger than strength of the sealing resin 60 filled in the shallow trenches.

Therefore, the image pickup apparatus 1A has further higher reliability than the image pickup apparatus 1.

Note that as shown in FIG. 8, the four first trenches C10 of the first optical member 10A are not equal in the depth D10A. In other words, the plurality of trenches of the first optical member 10A may have different depths, and the plurality of trenches of the second optical member 20 may also have different depths.

<Modifications 2 and 3 of First Embodiment>

Figures 10A, 10B, 10C:
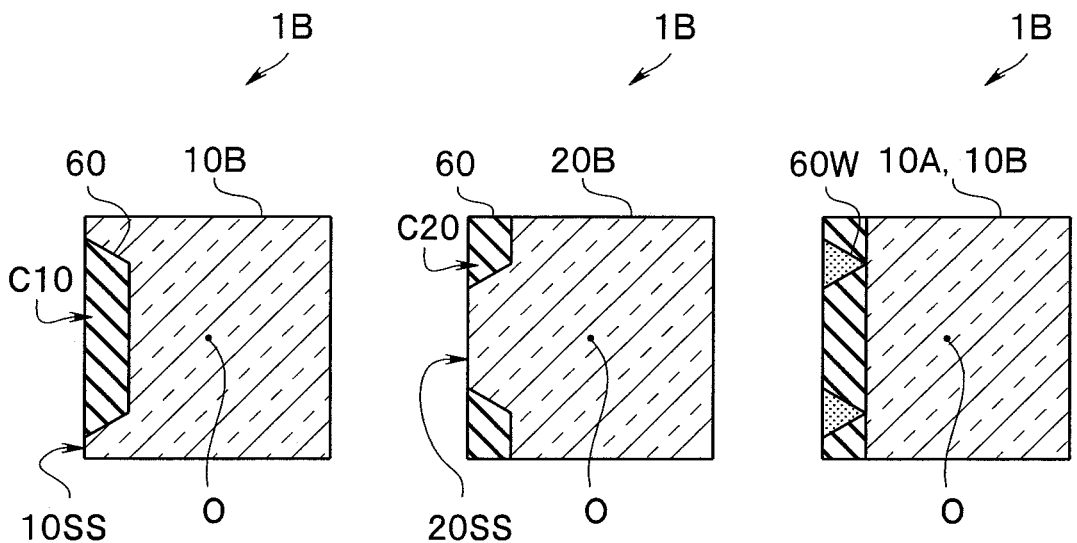
FIG. 10A is a cross-sectional view of a first optical member of an image pickup apparatus according to Modification 2 of the first embodiment.
FIG. 10B is a cross-sectional view of a second optical member of the image pickup apparatus according to Modification 2 of the first embodiment.
FIG. 10C is a schematic cross-sectional view for explaining a stacked state of the image pickup apparatus according to Modification 2 of the first embodiment.

The image pickup apparatus 1B according to Modification 2 of the first embodiment shown in FIGS. 10A and 10B is configured such that a first trench C10 filled with the sealing resin 60 is provided in only one of the four first side faces 10SS of a first optical member 10B. A second optical member 20B has second trenches C20 filled with the sealing resin 60 in corners of only one of the four second side faces 20SS. The second optical member 20B has a second side face 20SS that does not have any first trench C10 filled with the sealing resin 60. As shown in FIG. 10C, the sealing resin 60 disposed in the first trench C10 and the sealing resin 60 disposed in the second trenches C20 include sealing resin 60W in which both the sealing resins 60 are superimposed with each other.

Figures 11A, 11B, 11C:
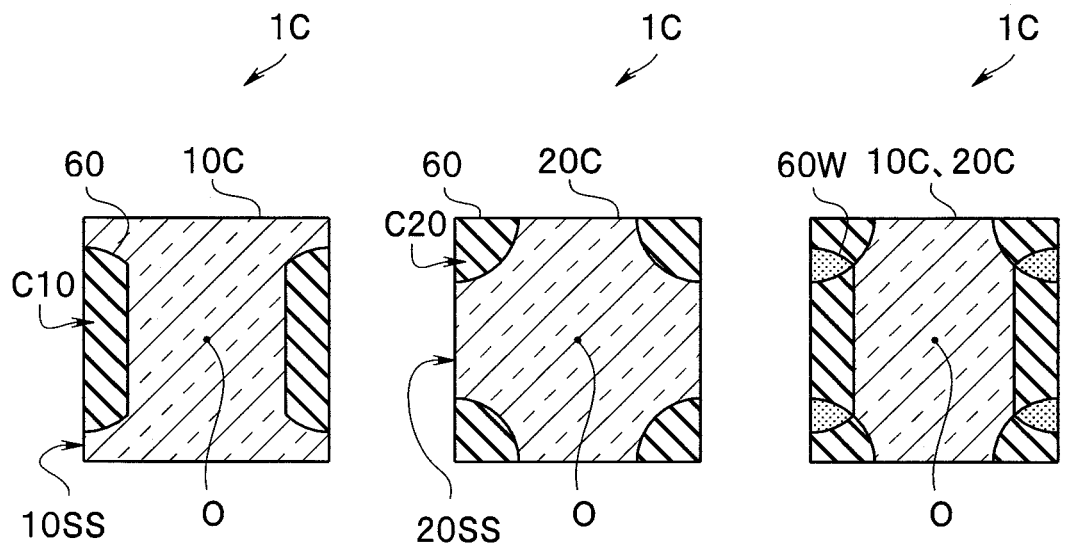
FIG. 11A is a cross-sectional view of a first optical member of an image pickup apparatus according to Modification 3 of the first embodiment.
FIG. 11B is a cross-sectional view of a second optical member of the image pickup apparatus according to Modification 3 of the first embodiment.
FIG. 11C is a schematic cross-sectional view for explaining a stacked state of the image pickup apparatus according to Modification 3 of the first embodiment.
Figure 12:
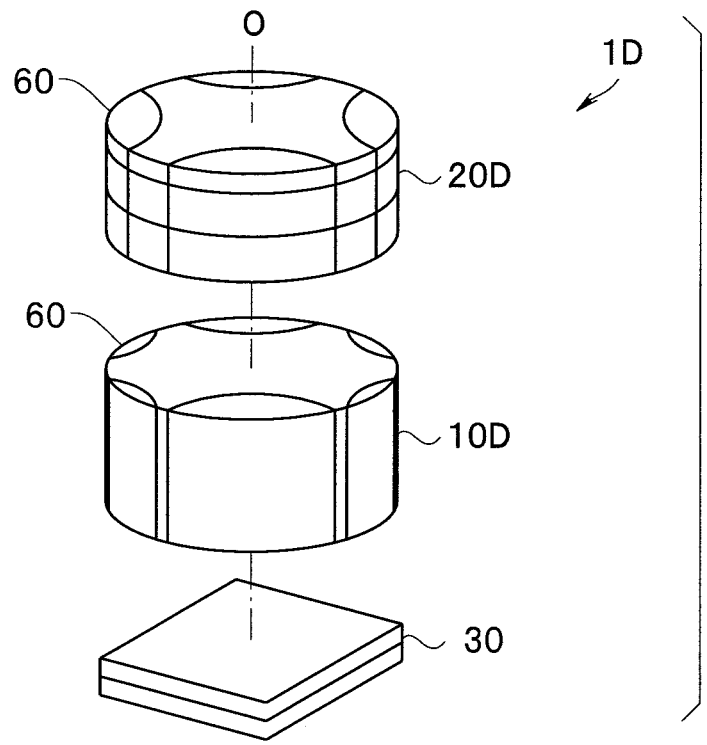
FIG. 12 is an exploded cross-sectional view of an image pickup apparatus according to a second embodiment.

The image pickup apparatus 1C according to Modification 3 of the first embodiment shown in FIGS. 11A and 11B is configured such that two first side faces 10SS of a first optical member 10C have respective first trenches C10 filled with the sealing resin 60. When taken in a direction orthogonal to the optical axis, an outer periphery of a cross-section of each of the first trenches C10 parallel to the optical axis is made up of curves and a straight line. A second optical member 20C has second trenches C20 filled with the sealing resin 60 in corners. When taken in a direction orthogonal to the optical axis, an outer periphery of a cross-section of the second trench C20 parallel to the optical axis is made up of a curve. As shown in FIG. 11C, the sealing resin 60 disposed in the first trenches C10 and the sealing resin 60 disposed in the second trenches C20 include sealing resin 60W in which both the sealing resins 60 are superimposed with each other.

In the image pickup apparatus according to the embodiment, it is sufficient that at least one of the first trenches is provided in at least any of the plurality of first side faces of the first optical member and that at least one of the second trenches is provided in at least any of the plurality of second side faces of the second optical member. The cross-sections of the bottom faces and side faces of the trenches in a direction orthogonal to the optical axis may be either rectilinear or curvilinear.

Note that the sealing resin 60 covers at least part of the side faces of the first bonding layer 41 and at least part of the side faces of the second bonding layer 42.

Second Embodiment

An image pickup apparatus 1D according to a second embodiment is similar to the image pickup apparatus 1 and provides the same effects as the image pickup apparatus 1. Thus, components of the same functions as those in the image pickup apparatus I are denoted by the same reference signs as the first embodiment, and description thereof will be omitted.

A first optical member 10D and a second optical member 20D of the image pickup apparatus 1D according to the second embodiment shown in FIGS. 12 and 13A to 13C are substantially cylindrical in shape, and trenches are formed on respective outer peripheral surfaces of the first optical member 10D and the second optical member 20D such that outer peripheries of respective cross-sections of the first optical member 10D and the second optical member 20D are each made up of a plurality of circular arcs having the same radius of curvature, the cross-sections being orthogonal to the optical axis O. Bottom faces of the trenches parallel to the optical axis O define near side faces C10DSS and C20DSS.

Figure 13A:
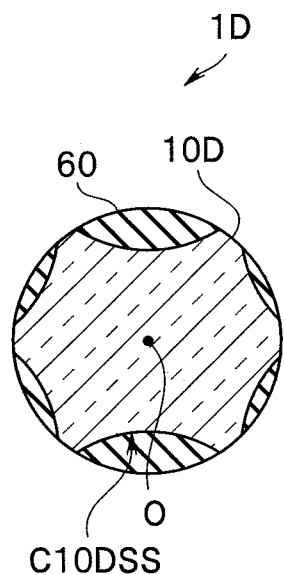
FIG. 13A is a cross-sectional view of a first optical member of the image pickup apparatus according to the second embodiment.
Figure 14:
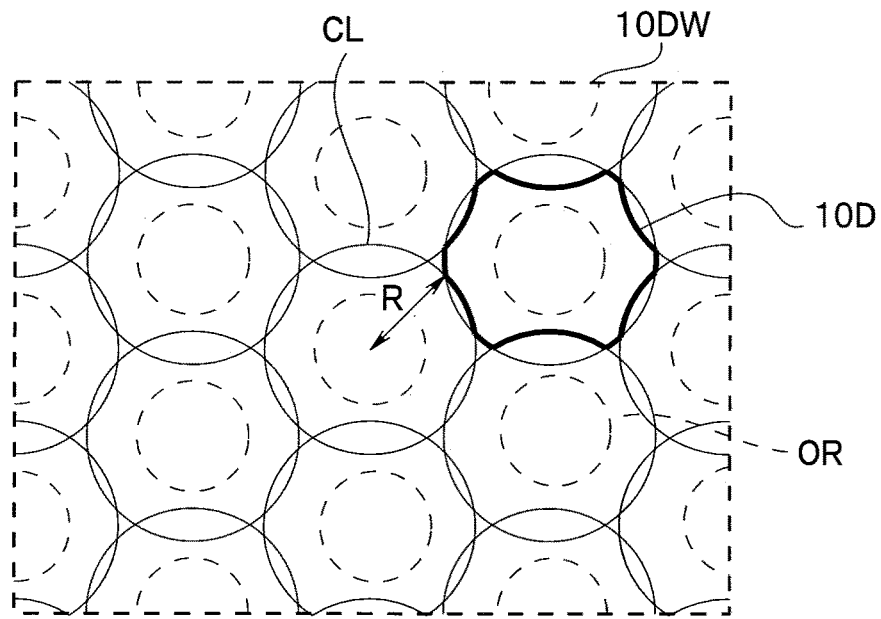
FIG. 14 is a top view for explaining a method for producing the first optical member of the image pickup apparatus according to the second embodiment.

As shown in FIG. 14, the first optical member 10D is made by cutting a stacked optical wafer 10DW made up of optical wafers stacked together. For example, when cutting is done using a laser, cutting-plane lines CL can be curves. Because the stacked optical wafer 10DW is cut along cutting-plane lines CL made up of circles with radius R, the first optical member 10D shown in FIG. 13A is made.

Figure 13B:
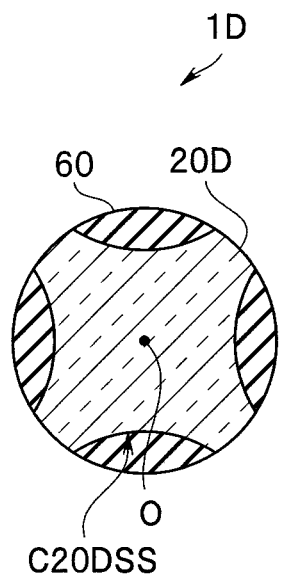
FIG. 13B is a cross-sectional view of a second optical member of the image pickup apparatus according to the second embodiment.
Figure 13C:
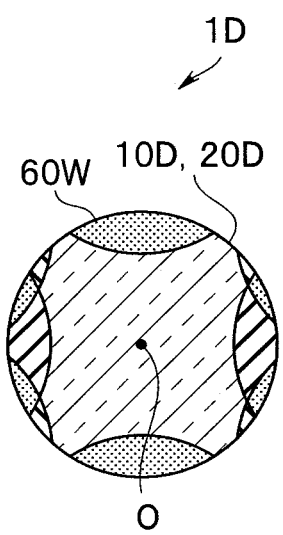
FIG. 13C is a schematic cross-sectional view for explaining a stacked state of the image pickup apparatus according to the second embodiment.
Figure 15:
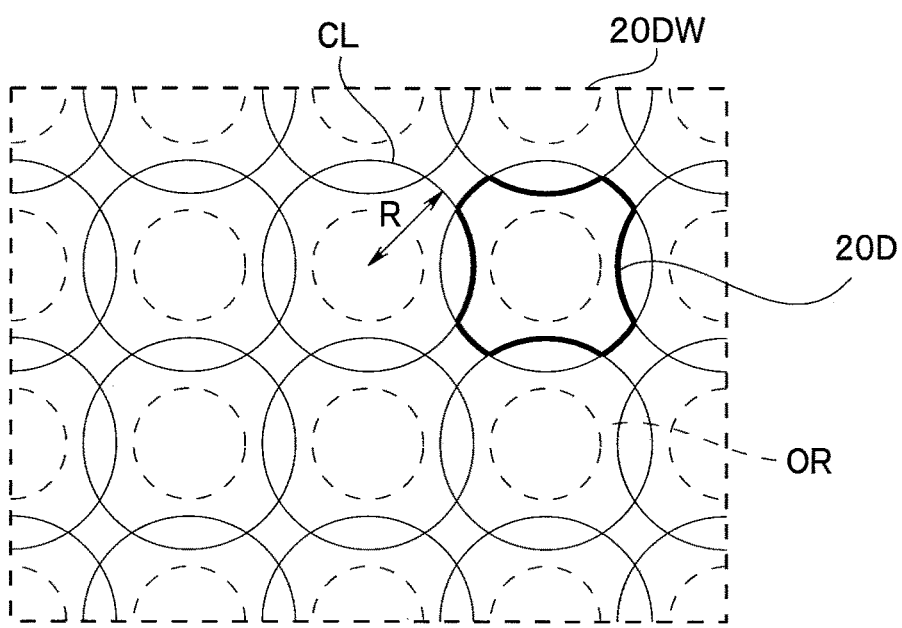
FIG. 15 is a top view for explaining a method for producing the second optical member of the image pickup apparatus according to the second embodiment.

As shown in FIG. 15, the second optical member 20D is also made by cutting a stacked optical wafer 20DW along cutting-plane lines CL made up of circles with radius R, as in the first optical member 10D. Because of difference in layout of cutting-plane lines CL from the first optical member 10D, the second optical member 20D shown in FIG. 13B is made.

Since the first optical member 10D and the second optical member 20D allow the trenches in side faces to be formed simultaneously when the stacked optical wafer is cut, the image pickup apparatus 1D is easier to produce than the image pickup apparatus 1. Besides, because of being cylindrical in shape, the image pickup apparatus 1D is smaller in diameter than the image pickup apparatus 1.

Third Embodiment

An image pickup apparatus 1E according to a third embodiment is similar to the image pickup apparatus 1 and provides the same effects as the image pickup apparatus 1. Thus, components of the same functions as those in the image pickup apparatus I are denoted by the same reference signs as the first embodiment, and description thereof will be omitted.

Figure 16:
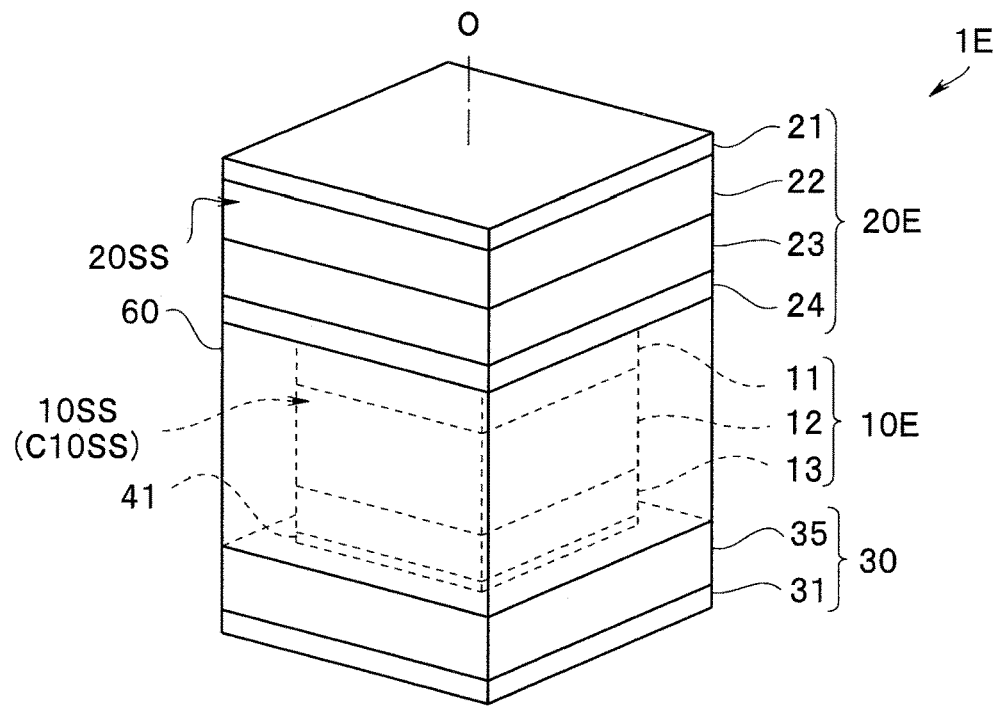
FIG. 16 is a perspective view of an image pickup apparatus according to a third embodiment.
Figure 17:
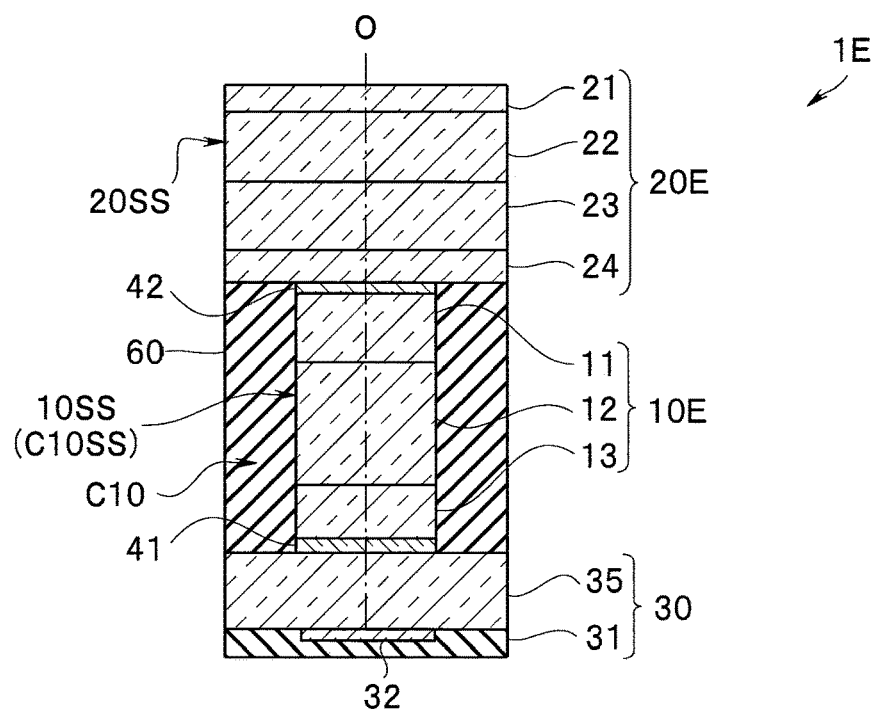
FIG. 17 is a cross-sectional view of the image pickup apparatus according to the third embodiment.

In the image pickup apparatus 1E shown in FIGS. 16 and 17, all four first side faces 10SS of a first optical member IOE are first near side faces C10SS closer to the optical axis O than are the second side faces 20SS and the image pickup side faces 30SS. In other words, the first trenches C10 are provided in all the four first side faces 10SS.

On the other hand, no trench is formed in four second side faces 20SS of a second optical member 20E.

The sealing resin 60 filled in the first trenches C10 covers not only the first near side faces COSS but also all side faces of the first bonding layer 41 and all side faces of the second bonding layer 42.

In the image pickup apparatus 1E, the bonding strength of the first bonding layer 41 and the second bonding layer 42 is further improved compared to the image pickup apparatus 1. Furthermore, since the side faces of the first bonding layer 41 and second bonding layer 42 are covered entirely with the sealing resin 60 resistant to moisture, the image pickup apparatus 1E excels in moisture resistance.

In particular, there is a case where the first bonding layer 41 is increased in thickness to adjust optical path length. However, since the first bonding layer 41 is covered with the sealing resin 60, the moisture resistance of the image pickup apparatus I E will not deteriorate.

Needless to say, the endoscopes 9A to 9E respectively equipped with the image pickup apparatuses 1A to 1E have the effects of the respective image pickup apparatuses 1A to 1E as well as the effects of the endoscope 9.

The present invention is not limited to the embodiments and the like described above, and various alterations, combinations, and applications are possible without departing from the gist of the invention.

What is claimed is:

1. An image pickup apparatus for use with an endoscope, the image pickup apparatus comprising:
    an image pickup member provided with an image sensor;
    a first optical member comprising one or more first optical elements stacked in an optical axis direction, the first optical member comprising:
        one or more first side faces parallel to the optical axis direction; and
        a first trench formed on at least one of the one or more first side faces, each first trench extending from the at least one of the one or more first side faces to a first bottom surface;
    a second optical member comprising one or more second optical elements stacked in the optical axis direction, the second optical member being at least indirectly stacked with the first optical member in the optical axis direction, the second optical member comprising:
        one or more second side faces parallel to the optical axis direction; and
        a second trench formed on at least one of the one or more second side faces, each second trench extending from the at least one of the one or more second side faces to a second bottom surface, wherein the first trench and the second trench including common portions overlapping in a direction orthogonal to the optical axis direction; and
    a sealing resin disposed in each of the first trench, the second trench and the common portions;
    wherein the image pickup member is at least indirectly stacked with the first optical member and the second optical member in the optical axis direction.

2. The image pickup apparatus according to claim 1, wherein
    the image pickup member comprises one or more image pickup side faces; and
    resin side faces of the sealing resin are flush with each of the one or more first side faces, the one or more second side faces, and the one or more image pickup side faces.

3. The image pickup apparatus according to claim 1, wherein the first trench is deeper than the second trench.

4. The image pickup apparatus according to claim 1, wherein:
    the one or more first side faces comprises a plurality of first side faces, at least one first trench is provided in each of the plurality of first side faces of the first optical member; and
    the one or more second side faces comprises a plurality of second side faces, at least one second trench is provided in each of the plurality of second side faces of the second optical member.

5. The image pickup apparatus according to claim 1, wherein:
    the one or more first side faces comprise one first cylindrical side face;
    the one or more second side faces comprise one second cylindrical side face;
    the first trench comprises one or more first circular arc trenches at the one first cylindrical side face; and
    the second trench comprises one or more second circular arc trenches at the one second cylindrical side face.

6. An endoscope comprising the image pickup apparatus according to claim 1.

7. The image pickup apparatus according to claim 1, further comprising:
    a first bonding layer bonding together the image pickup member and the first optical member; and
    a second bonding layer bonding together the first optical member and the second optical member.

8. The image pickup apparatus according to claim 1, wherein
    the first bottom surface is closer to the optical axis than the one or more first side faces; and
    the second bottom surface is closer to the optical axis than the one or more second side faces.

9. The image pickup apparatus according to claim 8, wherein
    the first bottom surface is parallel to the optical axis, and
    the second bottom surface is parallel to the optical axis.

10. The image pickup apparatus according to claim 1, wherein the image pickup member further comprises a cover glass disposed between the image sensor and one of the first optical member and second optical member.

11. The image pickup apparatus according to claim 1, wherein the one or more first side faces and the one or more second side faces each comprise a single cylindrical side face.

12. The image pickup apparatus according to claim 1, wherein the one or more first side faces comprises a plurality of first side faces and the one or more second side faces comprises a plurality of second side faces.

13. The image pickup apparatus according to claim 12, wherein:
    the first trench is formed completely between adjacent first side faces of the plurality of first side faces; and
    the second trench is formed at a junction between adjacent second side faces of the plurality of second side faces.

14. The image pickup apparatus according to claim 12, wherein:
    the first trench is formed on each of the first side faces of the plurality of first side faces; and
    the second trench is formed on each of the second side faces of the plurality of second side faces.

15. The image pickup apparatus according to claim 7, wherein the sealing resin further filling spaces in the optical axis direction adjacent to side faces of each of the first bonding layer and the second bonding layer.

16. The image pickup apparatus according to claim 10, the image pickup apparatus further comprising:
    a first bonding layer bonding together the image pickup member and the first optical member; and
    a second bonding layer bonding together the first optical member and the second optical member.

17. The image pickup apparatus according to claim 1, wherein:
    the one or more first optical elements comprising a plurality of first optical elements stacked in the optical axis direction; and
    the one or more second optical elements comprising a plurality of second optical elements stacked in the optical axis direction.

18. The image pickup apparatus according to claim 5, wherein the one or more first circular arc trenches and the one or more second circular arc trenches having a same radius.

19. An image pickup apparatus for use with an endoscope, the image pickup apparatus comprising:
- an image pickup member provided with an image sensor;
- a first optical member comprising one or more first optical elements, the first optical member having a first outer periphery in a direction orthogonal to an optical axis direction;
- a second optical member comprising one or more second optical elements, the first optical member, the second optical member and the image pickup member being at least indirectly stacked in the optical axis direction, the second optical member having a second outer periphery in the direction orthogonal to the optical axis direction;
- wherein the first outer periphery includes at least a first portion offset in the direction orthogonal to the optical axis direction towards an optical axis relative to other portions of the first outer periphery;
- the second outer periphery includes at least a second portion offset in the direction orthogonal to the optical axis direction towards the optical axis relative to other portions of the second outer periphery;
- a common portion of the first portion and the second portion overlap in the direction orthogonal to the optical axis direction;
- a sealing resin is disposed in the first portion, the second portion, and the common portion.

20. An image pickup apparatus for use with an endoscope, the image pickup apparatus comprising:
- an image pickup member provided with an image sensor;
- a first optical member comprising one or more first optical elements, the first optical member having a first outer periphery in a direction orthogonal to an optical axis direction; and
- a second optical member comprising one or more second optical elements, the first optical member, the second optical member and the image pickup member being at least indirectly stacked in the optical axis direction, the second optical member having a second outer periphery in the direction orthogonal to the optical axis direction;
- wherein the first outer periphery includes at least one projection projecting relative to the first outer periphery in the direction orthogonal to the optical axis direction away from an optical axis;
- the second outer periphery includes at least one concavity offset relative to the second outer periphery in the direction orthogonal to the optical axis direction towards the optical axis;
- no portions of the at least one projection and at least one concavity align in the optical axis direction; and
- a sealing resin is disposed in the at least one cavity and around the first outer periphery other than the at least one projection.

* * * * *